United States Patent [19]

Marley

[11] Patent Number: 4,885,842
[45] Date of Patent: Dec. 12, 1989

[54] GUARD AND GUIDE FOR CORN CUTTERS

[76] Inventor: Clement F. Marley, R.R. 2, Box 165, Nokomis, Ill. 62075

[21] Appl. No.: 193,031

[22] Filed: May 12, 1988

[51] Int. Cl.$^4$ .......................... A47J 17/02; B26D 1/02
[52] U.S. Cl. .................................... 30/121.5; 30/287; 83/544; 83/856
[58] Field of Search .................................. 83/544–546, 83/856–858, 925 R; 30/121.5, 283, 286, 287

[56] References Cited

U.S. PATENT DOCUMENTS

| | | | |
|---|---|---|---|
| 53,849 | 4/1866 | McGill | 30/121.5 |
| 1,633,365 | 6/1927 | Ebmeier | 30/121.5 X |
| 2,326,873 | 8/1943 | Meek | 30/121.5 X |
| 2,511,933 | 6/1950 | McNair | 30/121.5 |
| 2,521,115 | 9/1950 | Calkins | 30/121.5 |
| 2,823,716 | 2/1958 | Gelder | 30/121.5 X |
| 3,077,909 | 2/1963 | Trenor | 30/121.5 |
| 4,402,137 | 9/1983 | Kovach | 30/121.5 |

Primary Examiner—Frank T. Yost
Assistant Examiner—Eugenia A. Jones

[57] ABSTRACT

A guard-guide device for protecting the hands of the operator of vertical sweet corn cutters and for keeping cutting knives properly aligned. The device comprises an overlapping set of guards and guides attached to the two halves of a sweet corn cutter to be spaced above and outward from the opposed half-round knives of the cutter. The half-round knives of the sweet corn cutter are mounted on top of flexible legs attached to a metal base or can be stamped from a single piece of metal. As corn is pushed down between the knives the natural outward taper of the cob causes the metal legs to move outward. The overlapping guards also expand outward at the same time and in so doing keep the metal knives aligned at 180 degrees to each other for perfect cutting of corn kernels. As the downward thrust of the corn ear is completed the overlapping guards keep the operators fingers from coming into contact with the sharp cutting edges.

1 Claim, 1 Drawing Sheet

GUARD AND GUIDE FOR CORN CUTTERS

BACKGROUND OF INVENTION

This invention relates to a faster and safer method of cutting fresh sweet corn from the ear and doing so in a way so as to produce whole kernels rather than cut-up kernels such as you get when using an ordinary kitchen knife.

There is an ever increasing demand for sweet corn as plant breeders produce more tasteful varieties and as new recipes appear and as salad bars become ever more popular.

There is also an increasing number of older citizens who like the taste of freshly-cut sweet corn even if they cannot eat it directly from the ear.

Entrepreneurs have learned also that there is a demand for sweet corn the year around, and producers have learned how to find suitable climates to grow it and ship it to colder climates.

Earlier inventions have featured rounded cutting edges for sweet corn but without safety guards.

SUMMARY OF THE INVENTION

Among the several objects of this invention may be noted the provision of a device for cutting kernels from ears of fresh sweet corn by thrusting corn ears downward between two half-round knives in an opposed configuration while keeping those knives perfectly aligned with each other and also protecting the hands of the operator from being cut by the blades. A second object of this invention is to cut all kernels at their point of attachment to the corn cob and thus not to damage the appearance of the whole corn kernels.

DESCRIPTION OF A PREFERRED EMBODIMENT

Figure 1:
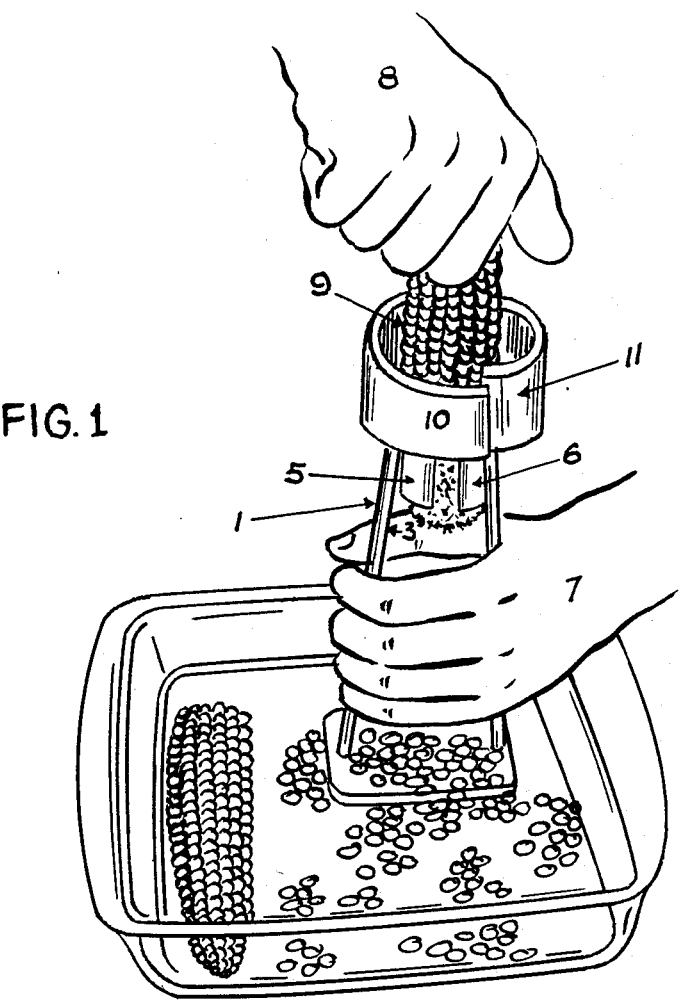
FIG. 1 is a side view of the corn cutter in operation. It shows how two hands are used to operate the cutter. At the top it shows guards in their relation to the knives and it shows how the guard overlap and keep the knives aligned at 180 degrees to each other.

Referring now to the drawings, FIG. 1, there is a device for cutting fresh sweet corn kernels from corn ears. The device comprises a base plate 2 which supports legs 3 and 4 onto which opposed half-round knives 5 and 6 are attached.

Operator's hand 7 grips legs 3 and 4 and holds them snug against corn ear while operator's other hand 8 grips and pushes down on corn ear 9.

Overlapping guards 10 and 11 keep metal knives 5 and 6 in perfect alignment as knives spread open with the tapering of the corn ear, and guards 10 and 11 prevent operator's hand 8 from reaching the cutting edges of the knives.

Figure 2:
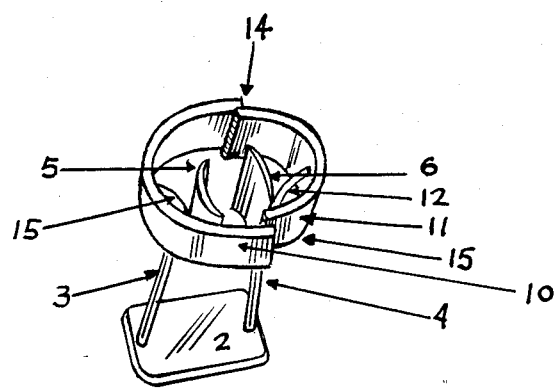
FIG. 2 is an elevated view of the corn cutter showing it in three-quarter section. It shows the opposed half-round knives mounted on legs and attached to a base plate and the configuration of the device for attaching the opposed half-round overlapping guards which also serve as guides for the knives.

FIG. 2 is an unobstructed elevated view of the corn cutter, the knives, and the guards. Attached to base plate 2 are legs 3 and 4. Half-round knives 5 and 6 are fastened to legs 3 and 4. Half-round guards 10 and 11 are attached to bends 12 and 13 at upper ends of legs 3 and 4. Guards 10 and 11 overlap at points 14 and 15.

What is claimed is:

1. A corn cutting device for cutting kernels of corn from a corn cob comprising a base, two flexible upright legs having a bottom end connected to the base and a top end spaced therefrom and adapted to move toward each other by hand pressure, rigid curved knives attached to said legs intermediate the ends, and a combination guard and guide device attached to the top end of said legs, said guard and guide device comprising opposed, horizontally-mounted U-shaped members spaced outwardly from the knives, said U-shaped members being spaced above the cutting edges of said knives for protecting the hands of the operator from contacting said knives, one of said U-shaped members being smaller than the other of said U-shaped members to allow the U-shaped members to overlap and move in and out as the knives engage the corn cob.

* * * * *